E. H. GOLD.
CONVERTIBLE HEATING SYSTEM.
APPLICATION FILED JAN. 30, 1905. RENEWED MAY 1, 1906.
925,896.
Patented June 22, 1909.
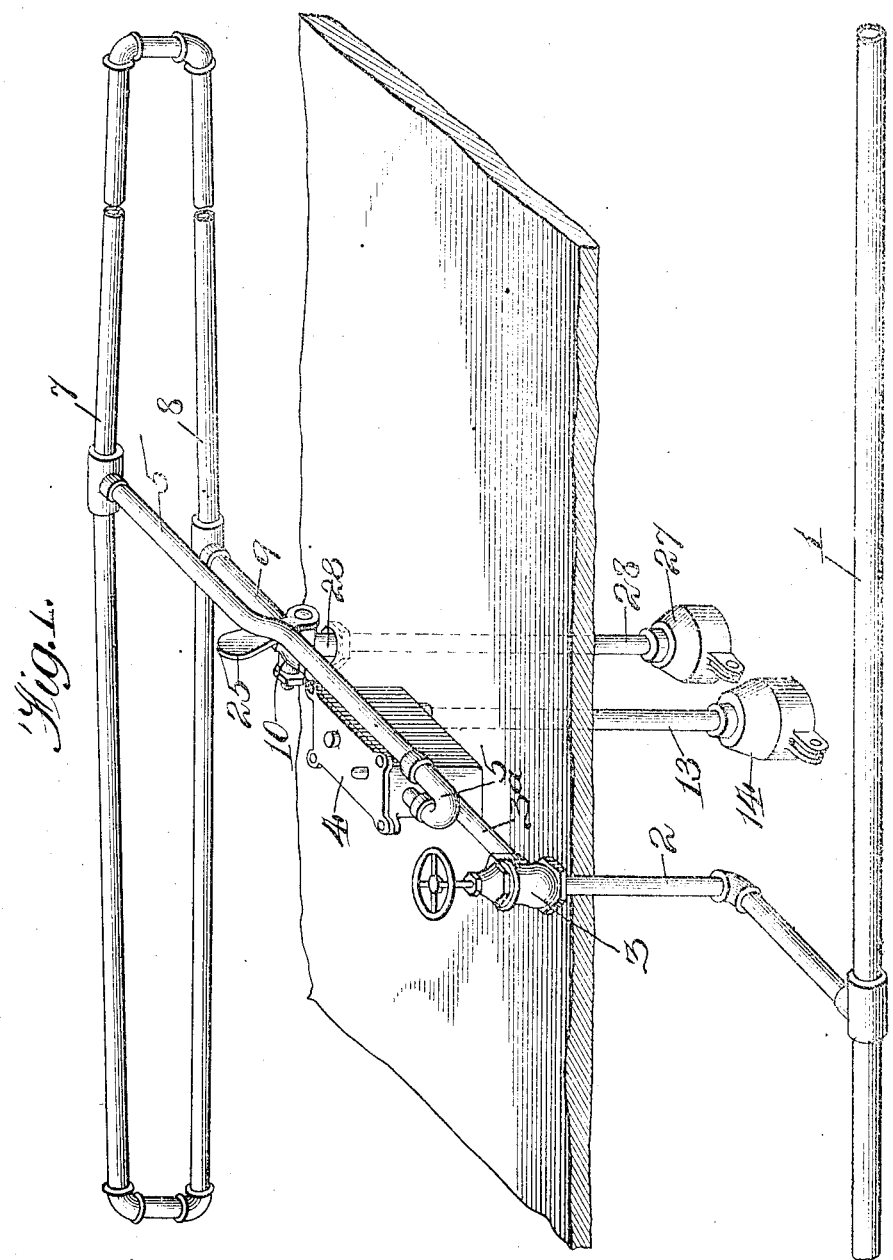

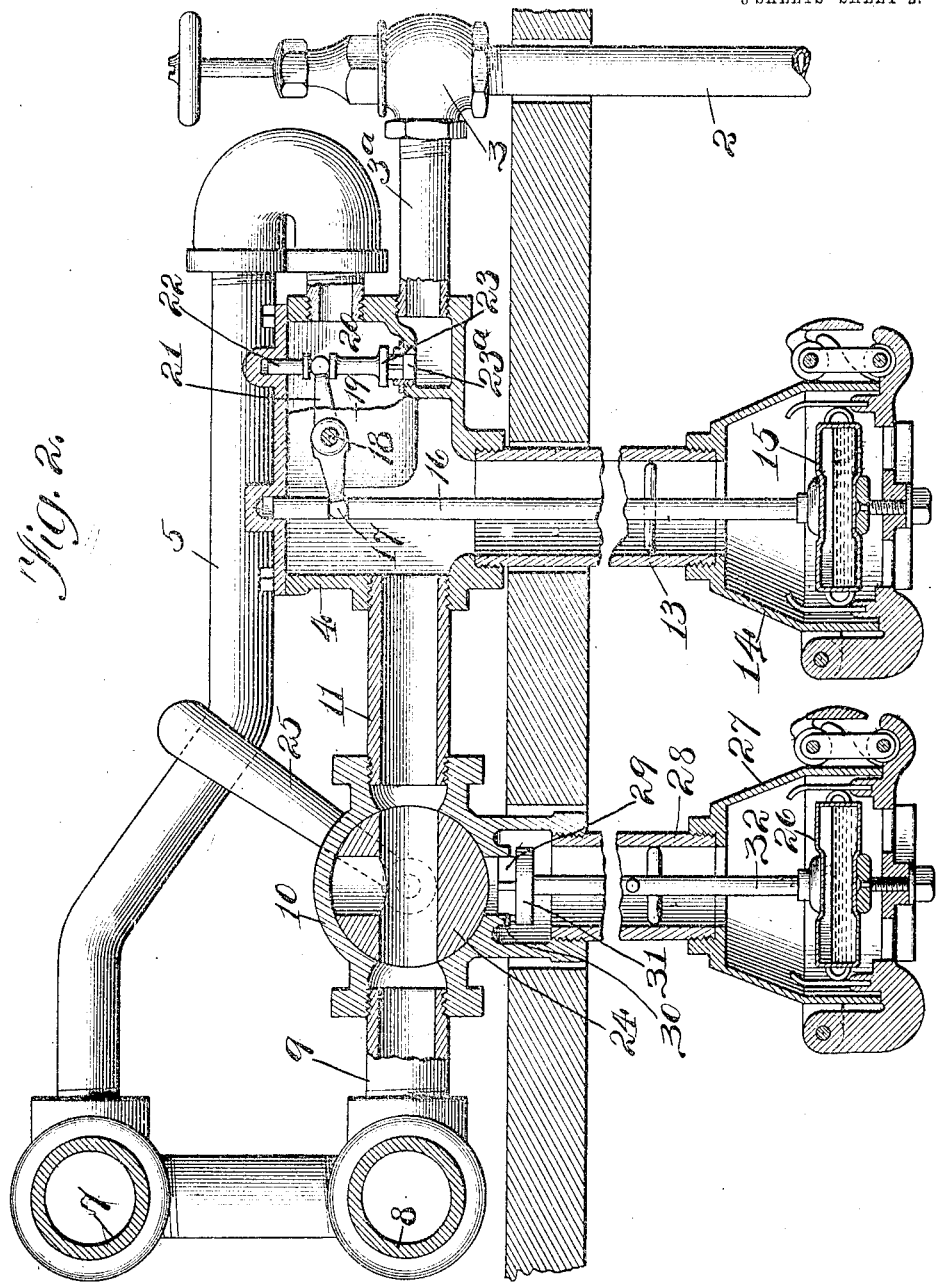

E. H. GOLD.
CONVERTIBLE HEATING SYSTEM.
APPLICATION FILED JAN. 30, 1905. RENEWED MAY 1, 1906.
925,896.
Patented June 22, 1909.
3 SHEETS—SHEET 3.
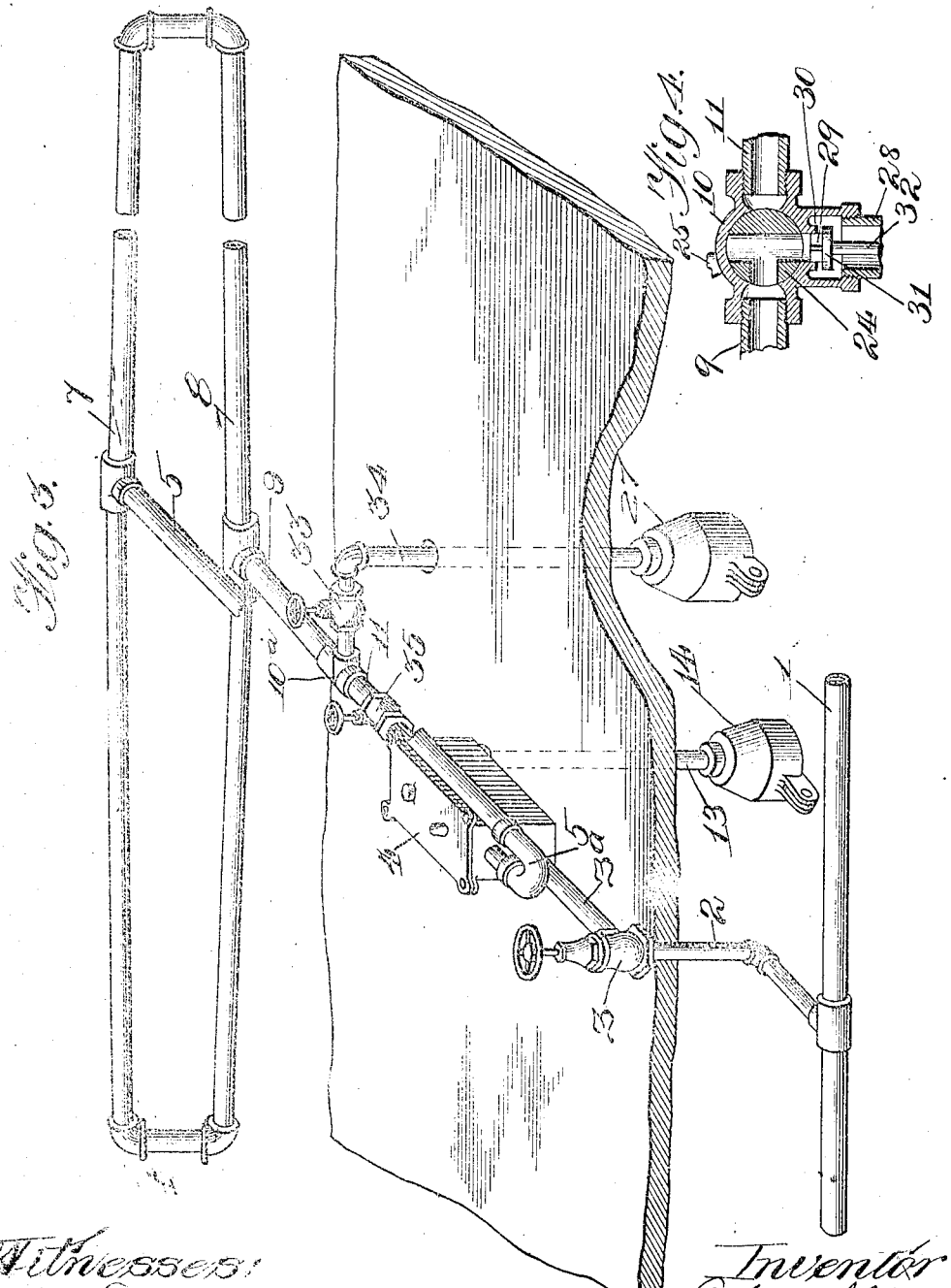
Witnesses:
Inventor
Egbert H. Gold
by Raymond & Barnett
Attys.

UNITED STATES PATENT OFFICE.

EGBERT H. GOLD, OF CHICAGO, ILLINOIS.

CONVERTIBLE HEATING SYSTEM.

No. 925,896.     Specification of Letters Patent.     Patented June 22, 1909.

Application filed January 30, 1905, Serial No. 243,361. Renewed May 1, 1906. Serial No. 314,698.

*To all whom it may concern:*

Be it known that I, EGBERT H. GOLD, a citizen of the United States, residing at Chicago, in the county of Cook and State of Illinois, have invented certain new and useful Improvements in Convertible Heating Systems, of which the following is a specification.

My invention relates to improvements in heating sytems, especially of the direct steam heating type.

A main object of my invention is to provide such a system, which may be converted at will from a direct high pressure and normally closed system to a low pressure, open system in which the rate of supply of the heating medium is automatically controlled by the thermostatic condition of said heating medium within said system, and vice versa. This and other objects as hereinafer explained are attained by my invention, which is more specifically set forth in the claims herein and which is shown in a convenient embodiment thereof in the hereto attached drawings, in which—

Figure 1 shows, diagrammatically, a complete heating system. Fig. 2 is a sectional view of a part thereof. Fig. 3 shows, diagrammatically, a modified embodiment of my invention; and Fig. 4 shows the 3-way cock of Fig. 2, in reversed position.

Like characters of reference indicate the same parts in the several figures of the drawings.

Inasmuch as my system is particularly adapted and intended for use as a car heating system, I hereinafter refer to it as such, but do not thereby necessarily limit myself to such application.

Referring to the accompanying drawings, 1 is a main supply pipe, such as a train-pipe, for carrying the heating medium, which may be of any suitable character, but which, for convenience, but without limitation, I hereafter refer to as steam.

2 is a feed-pipe for conducting the heating medium through the hand-operated valve 3, to the casing of the automatic control device 4, from which it passes through the pipe 5 into the circulating pipes 7 and 8 and back through the return 9.

When the parts are in the position shown in Fig. 2, the steam will also flow through the three-way cock 10, and the connecting pipe 11, into the chamber 12 of the control device, and thence through the drip or blow-off 13, through the diaphragm-chamber 14 to the atmosphere.

The system broadly and the controlling device are generically the same as shown in my Patents Nos. 758,436 and 771,628, the controlling device comprising an expansible diaphragm 15 exposed within the diaphragm casing 14, which is adapted to move the stem 16. This stem engages a lever-arm 17 mounted upon the spindle 18, which extends through a suitable stuffing-box and through the partition 19 into the inlet chamber 20 of the casing 4. Within the inlet chamber 20 is a lever 21, which is also rigidly secured to the spindle 18 and engages a valve-stem 22, which carries a valve 23 adapted to close a port 23ª which connects the inlet chamber 20 with the pipe 3ª extending between the valve 3 and the casing 4.

24 is a three way cock mounted in the casing 10, adapted to be operated by the external handle 25 and arranged to alternately close communication between the system of circulating pipes and the automatic controlling device, while opening communication between the circulating pipes and an automatic steam-trap, and vice versa. This steam-trap is of a familiar type, comprising a diaphragm 26, mounted in the casing 27, the interior of which communicates, through the pipe 28, with a drip, or blow-off, port 29 leading from the interior of the casing 10. This blow-off port is surrounded by a valve seat 30, which a valve 31 is adapted to close, said valve 31 being carried by a stem 32, by means of which the valve will be closed by the expansion of the diaphragm 26.

It will thus be seen that when the parts are set in the position shown in Fig. 2, the system will be in open communication with the atmosphere through the drip pipe 13. Consequently, the steam within the system can never exceed atmospheric pressure, and the diaphragm 15 will expand under the temperature of steam at atmospheric pressure to shut off the inflow from the train-pipe to the system, through the inlet chamber 20, and such condition will be constantly maintained. If, however, it be desired to fill the circulating pipes with steam at train-pipe pressure, the 3-way cock 24 will be moved to the position shown in Fig. 4, whereupon communication between the casing 10 and the connecting pipe 11 will be closed, the automatic controlling device will be cut out and the automatic trap will be cut in, whereby the system is at once converted into a high pressure, closed system, from which the only outlet is through the automatic trap.

Whenever the trap diaphragm 26 contracts, the valve 31 will unseat, allowing the accumulated water of condensation to escape, but as soon as the water and cold air has been blown out, and live steam from the circulating system surrounds the trap diaphragm 26, that diaphragm will expand and close the valve 31. The valve with its controlling thermostat therefore restricts the outflow of the heating medium, thus causing rise of pressure therein, the thermostat being preferably set so that substantially no steam escapes.

In Fig. 3, I have, for convenient illustration, shown one modification, in which a tee 10ª is substituted for the casing 10 and connects, through a valve 33, with a pipe 34 leading to the automatic trap 27, and a valve 35 is interposed between the tee 10ª and the controlling device 4. By closing the valve 35 and opening the valve 33, the controlling device will be cut out and the trap cut in, thus giving a high pressure system, while the reverse operation of the valves will cut out the trap and cut in the controlling device, thus converting the system into a low pressure system.

Obviously, as a matter of mechanical skill, expediency and shop practice, various changes in detail may be made, without departing from the spirit of my invention, which broadly contemplates a system of the character described which may be converted, at will, from a low pressure system, normally open, to a substantially closed, high pressure system, and vice versa. Thus, it will be seen that I am not necessarily limited either to the exact form or arrangement of valves, to the use of an automatic trap to the use of any precise form of controlling apparatus. So, also, it will be seen that, while it is necessary to cut off the normally open outlet in order to produce a high pressure system, for obviously there can be no high pressure so long as the system is in free communication with the open outlet, it is not essential that the automatic trap be cut out of operation when the device is changed to a low pressure system, for obviously, with one normally open outlet, it does not materially matter whether the system is also in communication with a second outlet which is adapted to be closed by an automatic device.

It will be noted that this present application is limited to the subject matter pointed out in the claims which relate to a system having two outlets, but in disclosing such subject matter it will be seen that I also disclose, broadly, certain inventions and improvements relating to an interchangeable high and low pressure system which form the subject matter of my co-pending applications No. 245,311 and 242,921, and although application No. 245,311 has been filed subsequent to the present application, it has been deemed desirable, in view of the fact that said applications are both co-pending with the present application, that the broad claims upon such inventions here disclosed be embodied in said application No. 245,311, and that certain other features be claimed in said application No. 242,921. Consequently, I do not in the present application claim the invention here disclosed, but covered by one or the other of said co-pending applications, and have canceled from this present application certain allowed broad claims covering the subject-matter common to the devices disclosed herein and that disclosed in said application No. 245,311; neither do I claim the specific mode of restricting the discharge of the heating medium from the system which consists in making the outlet of the system so small relative to its inlet that high pressure may be temporarily maintained in the system even though the outlet be in direct communication with the atmosphere; for combinations containing this feature are specifically claimed in my pending application Serial No. 268,908.

By the term outlet or discharge device used in the claims, I intend the devices and outlet passages generally conducting the condensed heating medium from the system after it has performed its function therein. When used to designate the instrumentalities connected with pipe 34, these terms are intended to include the valves as well as the thermostat or any equivalent devices.

I claim:

1. The combination with a system of circulating pipes provided with two outlets, of means for automatically controlling one of said outlets, means adapted to be influenced by the condition of the heating medium within said system to control the inflow of the heating medium to said system, means for cutting the actuating member of said inflow controlling means, and one of said outlets, out of operative relation to said system and for bringing the other of said outlets and the means for automatically controlling the same into operative relation to said system, and vice versa.

2. The combination of a system of circulating pipes provided with an outlet, of a thermostat exposed to the influence of the heating medium within said system, said system having a second outlet in proximity to said thermostat, said thermostat being arranged to control the inflow of the heating medium to said system, an automatically actuated valve for controlling the first named of said outlets, and means whereby the first named of said outlets may be cut out of operative relation to said system and the thermostat and second named of said outlets may be brought into operative relation to said system, and vice versa.

3. The combination with a system of circulating pipes provided with two outlets, of a thermostat within said system and arranged to automatically control the inflow of a heating medium to said system, means for automatically opening and closing one of said outlets, and valve mechanism whereby the automatically controlled outlet may be shut off from said system and said thermostat and the other of said outlets may be brought into operative relation with said system, and vice versa.

4. The combination with a system of circulating pipes provided with two outlets, of a thermostat arranged to be operatively influenced by the heating medium in said system to automatically control the inflow of the heating medium to said system, said thermostat being exposed within a part of said system which has communication with the atmosphere through one of said outlets, means for automatically opening and closing the other of said outlets, said last named outlet being shut off from operative relation to said system when said thermostat is in operative relation with said system, and valve mechanism whereby said thermostat and the other of said outlets may be shut off from operative relation to said system and said automatically controlled outlet may be brought into operative relation to said system, and vice versa.

5. The combination with a system of circulating pipes provided with two outlets, one of which is provided with means for automatically opening and closing it to permit the discharge of water of condensation, of a thermostat in the part of the system in communication with the other of said outlets and arranged to be operatively influenced by the condition of the heating medium in said system to automatically control the inflow of said heating medium to said system, and means for cutting said thermostat and said last named outlet out of operative relation to said system.

6. The combination with a system of circulating pipes provided with two outlets, of means for automatically opening and closing one of said outlets, means adapted to be operatively influenced by thermostatic conditions within said system to control the inflow to said system of a heating medium, and valve mechanism disposed within said system so as to direct the flow of the heating medium and thereby to alternately shut off said outlet controlling device and said inlet controlling device from operative relation with said system.

7. The combination with a system of circulating pipes provided with an outlet, of means for automatically controlling the opening and closing of said outlet, means adapted to be operatively influenced by the thermostatic conditions within said system to control the inflow to said system of a heating medium, and a three-way valve interposed in said system whereby either of said devices may be shut off from operative relation to said heating medium while the other of said devices remains in operative relation to said heating medium, and vice versa.

8. The combination with a radiating system provided with an outlet, of means for supplying a heating medium to the system at a relatively high pressure, means in communication with said system for automatically controlling said supply so as to at will maintain said heating medium in said radiating system at a relatively low pressure, said system having a second outlet, means for automatically controlling said second outlet, and means for simultaneously cutting said inlet controlling means out of operative relation with said system and for bringing said second outlet and its controlling means into operative relation with said system.

9. The combination with a radiating system, of means for supplying a heating medium thereto at a relatively high pressure, means comprising an inlet controlling device for automatically maintaining the heating medium within said radiating system at a relatively low pressure at will, a discharge device constructed so as to automatically control the discharge of water of condensation from said system, and means for simultaneously cutting said inlet controlling device out of operative relation with the system and for bringing said discharge controlling device into operative relation with said system.

10. The combination with a radiating system provided with an inlet port and with a discharge device constructed so as to automatically control the discharge of water of condensation from said system, of means for supplying a heating medium to said system at a relatively high pressure, means for automatically maintaining the heating medium in said heating system at a relatively low pressure at will, and means for cutting said discharge device out of operative relation to said system and for simultaneously cutting said automatic inlet controlling device into operative relation to said system.

11. The combination with a radiating system provided with an inlet port and with a discharge device constructed so as to automatically control the discharge of water of condensation from said system, means for supplying a heating medium to said system at a relatively high pressure, means in communication with said system for automatically maintaining the heating medium therein at a relatively low pressure at will, and a valve mechanism whereby said controlling device may be cut off from operative relation with said system and said inlet controlling device may be brought into operative relation with said system, and vice-versa.

12. The combination with a radiating system provided with two outlets, of means for supplying a heating medium to said system under high pressure, means in operative contact with the heating medium in said system for automatically maintaining said heating medium at a low pressure within said radiator pipes at will, means for cutting said automatic inlet controlling mechanism out of operative contact with the heating medium while simultaneously opening communication with one of said outlets, and means for automatically controlling said last-named outlet.

13. The combination with a radiating system provided with two outlets, of means for supplying a heating medium to said system, means for automatically controlling the inflow of said heating medium to said system, means for cutting said automatic controlling means and one of said outlets out of operative relation with said system, and for opening the other of said outlets.

14. The combination with a radiating system provided with two outlets, of means for supplying a heating medium to said system, means for automatically controlling the inflow of said heating medium to said system, and a valve arranged to simultaneously open one of said outlets and cut said inlet controlling means and the other of said outlets out of operative relation with said system.

15. A radiating system provided with an inlet and two outlets, a thermostatic valve to control one of said outlets, an automatic inlet controlling device in operative contact with the heating medium in said system to control the inflow of the heating medium to said system, and valve mechanism for shutting off communication between the heating medium and said inlet controlling device and the second outlet and for opening the thermostatically controlled outlet.

EGBERT H. GOLD.

Witnesses:
M. E. SHIELDS,
F. H. DRURY.